United States Patent
Brensinger

(10) Patent No.: US 11,401,730 B2
(45) Date of Patent: Aug. 2, 2022

(54) FOLDABLE CLOSED CELL FOAM SLEEPING PAD

(71) Applicant: NEMO EQUIPMENT, INC., Dover, NH (US)

(72) Inventor: Camon Brensinger, Stratham, NH (US)

(73) Assignee: NEMO EQUIPMENT, INC., Dover, NH (US)

( * ) Notice: Subject to any disclaimer, the term of this patent is extended or adjusted under 35 U.S.C. 154(b) by 282 days.

(21) Appl. No.: 16/733,397

(22) Filed: Jan. 3, 2020

(65) Prior Publication Data

US 2020/0305593 A1 Oct. 1, 2020

Related U.S. Application Data

(62) Division of application No. 15/878,989, filed on Jan. 24, 2018, now Pat. No. 10,524,563.

(Continued)

(51) Int. Cl.
| | |
|---|---|
| *E04H 15/54* | (2006.01) |
| *A47B 3/083* | (2006.01) |
| *A47B 13/08* | (2006.01) |
| *A47B 3/08* | (2006.01) |
| *A47B 3/06* | (2006.01) |
| *F16B 12/44* | (2006.01) |
| *A47B 3/12* | (2006.01) |

(Continued)

(52) U.S. Cl.
CPC ............ *E04H 15/54* (2013.01); *A47B 3/002* (2013.01); *A47B 3/06* (2013.01); *A47B 3/083* (2013.01); *A47B 3/0803* (2013.01); *A47B 3/12* (2013.01); *A47B 13/003* (2013.01); *A47B 13/088* (2013.01); *A47B 37/04* (2013.01); *A47C 27/05* (2013.01); *A47C 27/14* (2013.01); *A47G 9/06* (2013.01); *A47G 9/086* (2013.01); *E04H 15/42* (2013.01); *F16B 12/44* (2013.01); *A47B 2003/0806* (2013.01); *A47B 2200/001* (2013.01); *A47B 2220/0072* (2013.01); *F16B 2012/446* (2013.01)

(58) Field of Classification Search
CPC .......... A47C 27/14; A47C 27/05; A47G 9/06; A47G 9/086; A47G 27/02; E04F 15/02; E04F 15/22; A45C 7/00; A63B 21/00
See application file for complete search history.

(56) References Cited

U.S. PATENT DOCUMENTS

| | | | | |
|---|---|---|---|---|
| 3,284,819 A | * | 11/1966 | Nissen | A63C 19/04 5/420 |
| 4,370,767 A | * | 2/1983 | Fraser | A47C 1/143 5/417 |

(Continued)

*Primary Examiner* — Peter M. Cuomo
*Assistant Examiner* — Rahib T Zaman
(74) *Attorney, Agent, or Firm* — Preti Flaherty Beliveau & Pachios LLP

(57) ABSTRACT

A closed cell foam sleeping pad has a foldable configuration and can be folded accordion style. The sleeping pad's top and bottom surfaces have a plurality of protrusions and a plurality of indentations, wherein the protrusions and indentations are arranged at different locations on different but adjacent foldable sections of the sleeping pad body such that when the pad is folded accordion style, the protrusions nest into the indentations perfectly to give the sleeping pad a smaller packing density while at the same time providing the protrusions for added user comfort.

12 Claims, 5 Drawing Sheets

Related U.S. Application Data

(60) Provisional application No. 62/449,818, filed on Jan. 24, 2017.

(51) Int. Cl.

| | | |
|---|---|---|
| *A47B 37/04* | (2006.01) | |
| *A47B 13/00* | (2006.01) | |
| *E04H 15/42* | (2006.01) | |
| *A47C 27/05* | (2006.01) | |
| *A47C 27/14* | (2006.01) | |
| *A47G 9/06* | (2006.01) | |
| *A47G 9/08* | (2006.01) | |
| *A47B 3/00* | (2006.01) | |

(56) References Cited

U.S. PATENT DOCUMENTS

| | | | | |
|---|---|---|---|---|
| 4,466,516 A * | 8/1984 | Sicoli | ............... | A47G 9/062 190/2 |
| 4,801,005 A * | 1/1989 | Hahn | ............... | F16N 31/006 141/86 |
| 4,824,411 A * | 4/1989 | McClanahan | ....... | A47C 15/006 441/129 |
| 4,868,940 A * | 9/1989 | Masadi | ............... | A47C 27/001 5/417 |
| 5,051,293 A * | 9/1991 | Breitscheidel | ......... | B29C 53/06 428/157 |
| 5,066,001 A * | 11/1991 | Wilkinson | ......... | A63B 21/4037 482/52 |
| 5,491,851 A * | 2/1996 | Alonso | ............... | A47C 27/001 5/420 |
| 5,669,089 A * | 9/1997 | Dees | ....................... | B25H 5/00 5/417 |
| 5,950,260 A * | 9/1999 | Dees | ....................... | A47C 9/02 5/420 |
| 6,062,930 A * | 5/2000 | Smith | .................. | A47C 15/006 441/129 |
| 6,321,401 B1* | 11/2001 | Fleming | ............... | A47C 27/001 5/420 |
| 6,711,766 B2* | 3/2004 | Monk | .................... | A47B 95/02 5/417 |
| 9,675,151 B1* | 6/2017 | MacNeil | ............ | A47G 27/0206 |
| 10,136,736 B2* | 11/2018 | Franken | ............... | A47C 20/027 |
| 10,779,670 B1* | 9/2020 | Day | ................. | A47G 27/0206 |
| 10,842,303 B1* | 11/2020 | Vieveen | ............. | A47G 27/0293 |
| 2004/0137195 A1* | 7/2004 | Stephens, Jr. | ....... | A47G 27/0225 428/119 |
| 2008/0118671 A1* | 5/2008 | Bienkiewicz | .......... | A47G 9/062 428/12 |
| 2009/0179446 A1* | 7/2009 | Ahlers | ..................... | A45C 9/00 294/137 |
| 2010/0299833 A1* | 12/2010 | Kessler | ............. | A63B 21/4037 5/417 |
| 2015/0113730 A1* | 4/2015 | Wentland | ........... | A47G 27/0225 5/417 |
| 2015/0328495 A1* | 11/2015 | Soba | .................... | A63B 21/151 5/417 |
| 2016/0129299 A1* | 5/2016 | Newman | .................... | B32B 5/32 482/142 |
| 2019/0186155 A1* | 6/2019 | Huss | ..................... | E04F 15/107 |

\* cited by examiner

FOLDABLE CLOSED CELL FOAM SLEEPING PAD

CROSS-REFERENCE TO RELATED APPLICATIONS

This application is a Divisional Application of U.S. patent application Ser. No. 15/878,989 titled "SMALL TABLE FRAME", which was filed on Jan. 24, 2018 and which claims priority from U.S. Provisional Patent Application No. 62/449,818 filed on Jan. 24, 2017 and titled "OUTDOOR EQUIPMENT 2016", which is incorporated fully herein by reference.

TECHNICAL FIELD

The present invention relates to outdoor equipment, outdoor furniture, outdoor camping equipment and parts and fittings therefore, and more particularly, relates to closed cell foam pad which folds in an alternating "accordion style" pattern and to the construction of such a foldable foam sleeping pad having top and bottom surfaces with bumps or protrusions designed to nest into and with one another.

BACKGROUND INFORMATION

A large portion of the population enjoy camping and other outdoor activities. When engaged in these activities, however, many people enjoy some of the comforts of home.

Campers and others who sleep away from a home or motel often desire to soften the ground or floor on which they sleep with a foam pad. Although foam sleeping pads are well-known, hikers and other remote campers are concerned with the weight they must carry and also the volume they must carry. Accordingly, some sleeping pads are much too large, heavy and/or bulky and not really usable by hikers.

Foam sleeping pads are very comfortable and are not susceptible to puncture and loss of air. Unfortunately, however, the traditional foam pads are bulky to store and pack on a hike or other extended outdoor adventure. Accordingly, what is needed is a foam pad that provides a support surface while being easily foldable or collapsible into a relatively small package.

SUMMARY

The present invention features a foldable sleeping pad. The sleeping pad comprises a pad body having a top region, a bottom region, a length and a width. The pad body further includes a first plurality of fold lines disposed across generally the entire width of the pad body and formed in either the top or bottom region of the pad body depending on how the pad is intended to fold.

In one embodiment, the plurality of top region fold lines are arranged at predetermined intervals along the length of the pad body beginning a first distance from a first end of the length of the body portion. The plurality of bottom region fold lines are arranged at predetermined intervals along the length of the pad body portion beginning a second distance from the first end of the length of the body portion. In this embodiment, the first distance is different from the second distance.

The plurality of top and bottom region fold lines cooperate to form a plurality of foldable sleeping pad connected sections, and wherein the plurality of fold lines in the top and bottom regions of the pad body are configured to allow the foldable sleeping pad to fold "accordion style" such that one or more portions of the top region from one foldable sleeping pad connected section are adjacent and in contact with one or more portions of the bottom region from another one foldable sleeping pad connected section of the pad body when in a folded position.

In this embodiment, the plurality of fold lines in the top and bottom regions of the pad body are configured to allow the foldable sleeping pad to fold "accordion" style such that a bottom region of a first foldable sleeping pad section folds against a bottom region of a second foldable sleeping pad section that is connected to and adjacent said first foldable sleeping pad section, and wherein a top region of said second foldable sleeping pad section folds against a top region of a third foldable sleeping pad section that is connected to and adjacent the second foldable sleeping pad connected section, and wherein a remaining plurality of foldable sleeping pad sections fold accordion style against one another, alternating folding against the top and bottom regions of the adjacent remaining plurality of foldable sleeping pad sections.

In one embodiment, each of the top and bottom regions includes a plurality of protrusions and a plurality of indentations, wherein when the sleeping pad is disposed in the "accordion" like folded configuration, the plurality of protrusions from one of the top and bottom regions disposed on one section of the pad body nest into a corresponding plurality of indentations from another one of the top and bottom regions of an adjacent and connected section of the pad body.

In one embodiment, the plurality of protrusions and the plurality of indentations are arranged in a hexagonal pattern wherein a protrusion is placed at the center and vertices of a normal hexagon and a corresponding indentation is placed at the center and vertices of a normal hexagon and configured to meet with such a placed or arranged protrusion.

In another embodiment, the pad body is a two layer closed cell foam, and the pad body includes a heat reflective layer.

In yet another embodiment, the pad body has a first thickness and wherein the plurality of fold lines in the top and bottom portions of the pad body have a second thickness which is less than the first thickness and forming a hingeable connection between adjacent sections separated by the hinge of the connection.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
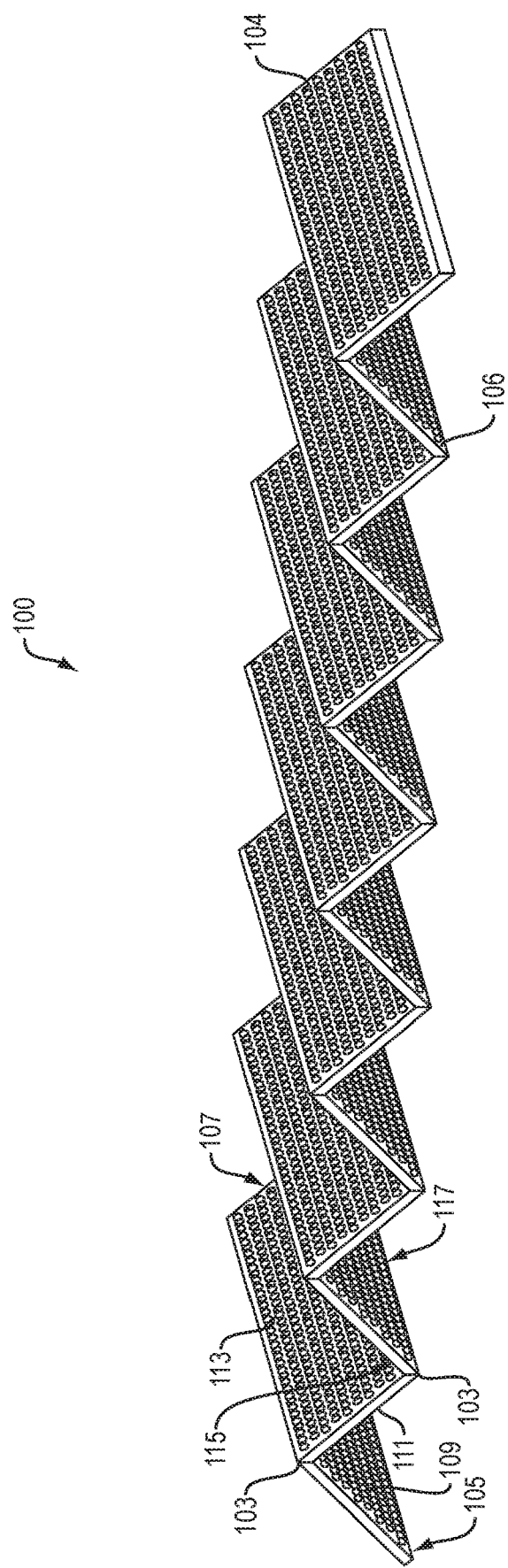
FIG. 1 is a perspective view of the accordion like folding configuration of a foldable sleeping pad, in accordance with the present invention.
Figure 3:
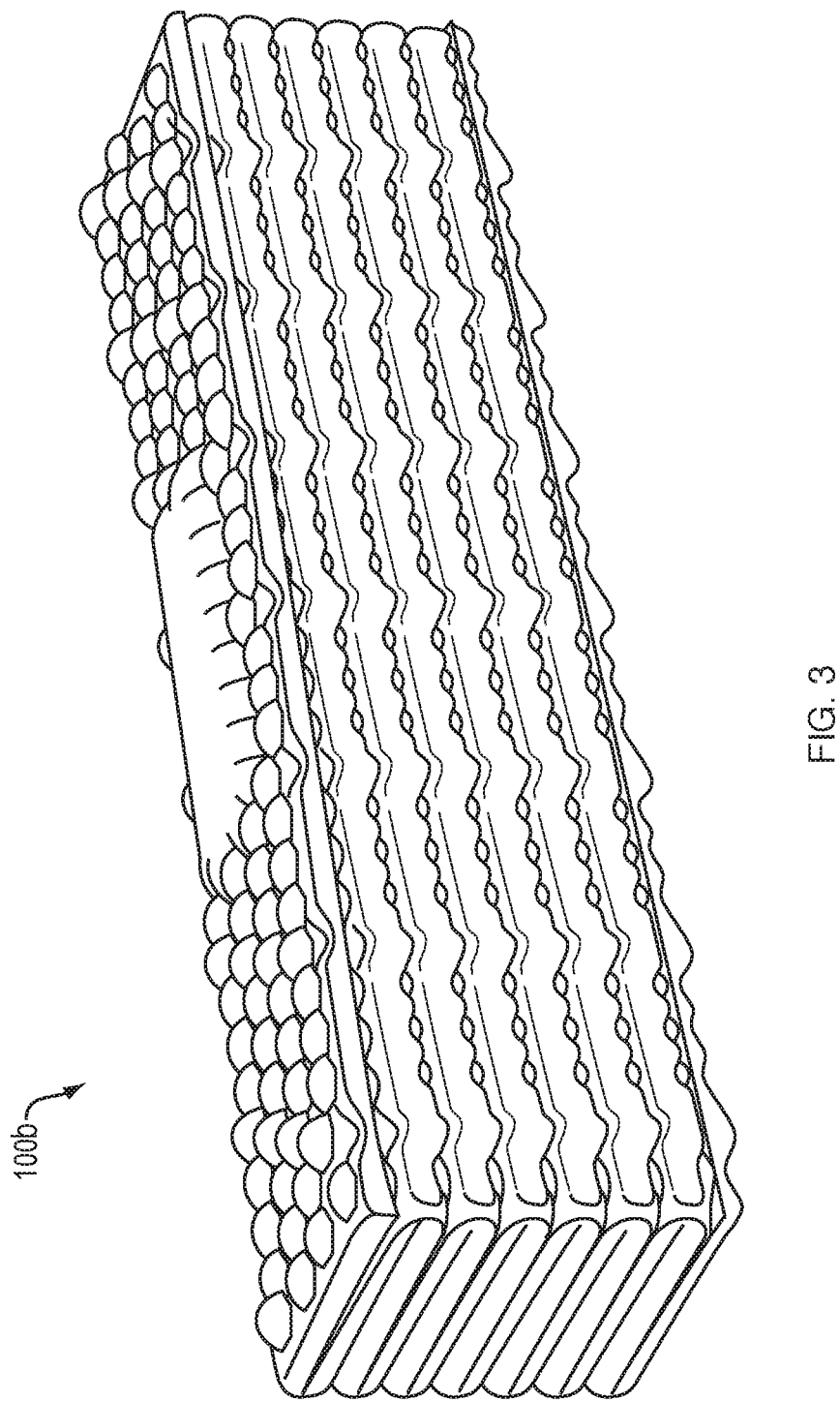
FIG. 3 is a perspective view of the sleeping pad of the present invention in a completely folded position.

The present invention features a closed cell foam pad 100, FIG. 1, which is made from a closed cell foam material and packs in an alternating "accordion style" folding pattern as shown in FIG. 3. The closed cell pad 100 includes a pad body having a top region 104 and a bottom region 106, a length "l" and a width "w". The pad body 100 further includes a first plurality of fold lines 102 disposed across generally the entire width of the pad body and formed in the top region of the pad body. The pad body also includes a second plurality of fold lines 103 disposed across generally the entire width of the pad body and formed in the bottom region of the pad body. The plurality of top region fold lines 102 are arranged at predetermined intervals along the length of the pad body beginning a first distance from a first end of the pad body portion, while the plurality of bottom region fold lines 103 are arranged at predetermined intervals along the length of the pad body portion beginning a second distance from the first end of the length of said body portion, such that the first distance is different from the second distance.

The plurality of top and bottom region fold lines 102, 103 form a plurality of foldable sleeping pad connected sections 105, 107 (and 112, 114). The plurality of fold lines in the top 104 and bottom 106 regions of the pad body are configured to allow the foldable sleeping pad to fold "accordion" style as shown at 100a in FIG. 3, such that, for example, a bottom region 109 of a first foldable sleeping pad section 105 folds against a bottom region 111 of a second foldable sleeping pad section 107 that is connected to and adjacent the first foldable sleeping pad section 105.

A top region 113 of the second foldable sleeping pad section 107 folds against a top region 115 of a third foldable sleeping pad section 117 that is connected to and adjacent the second foldable sleeping pad section 107. The remaining plurality of foldable sleeping pad sections fold "accordion" style against one another, alternating folding against the top and bottom regions of adjacent remaining plurality of foldable sleeping pad sections as shown in FIG. 3.

Figure 2:
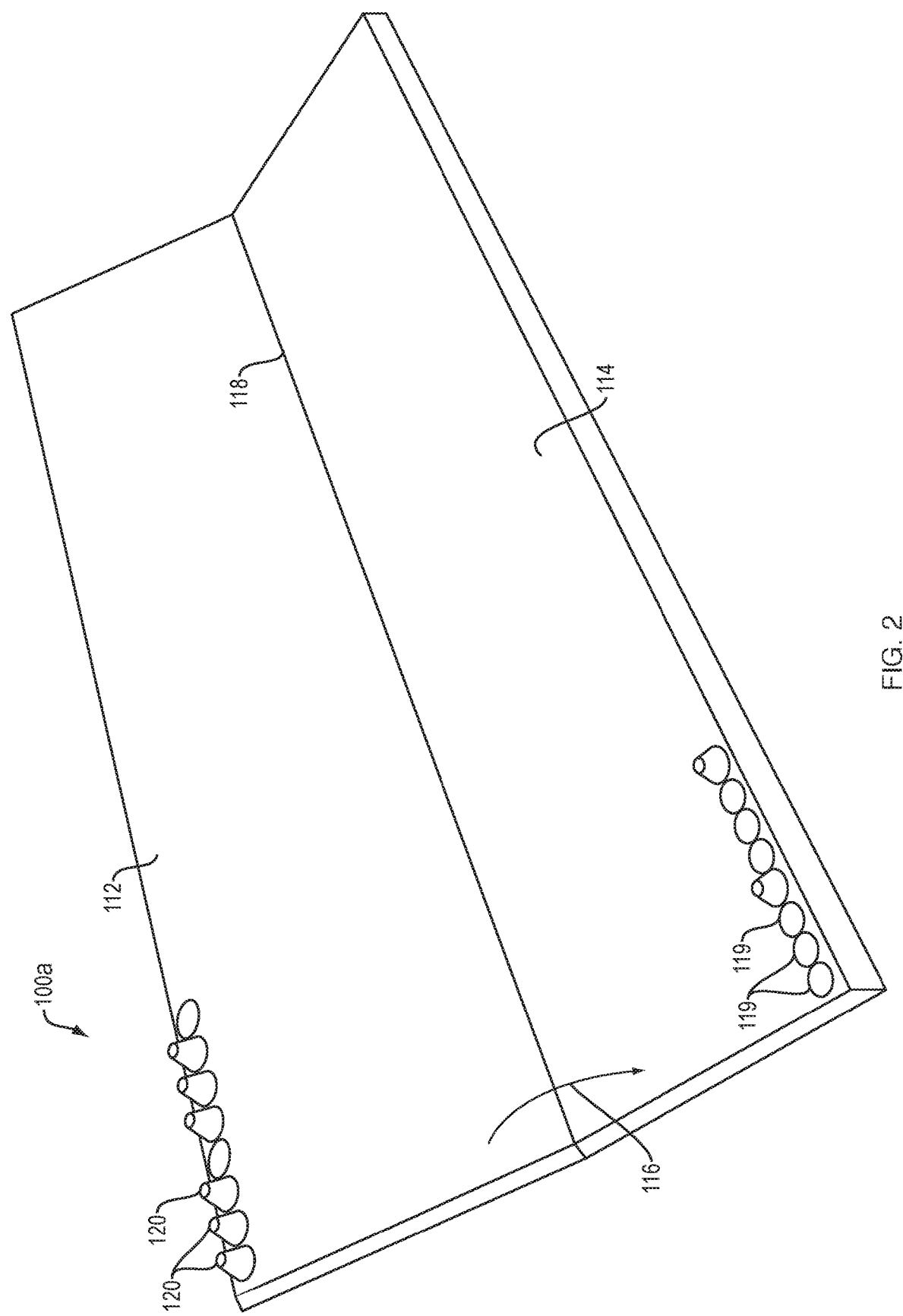
FIG. 2 is a perspective view of two sections of the foldable sleeping pad of the present invention illustrating the direction of fold and nesting of protrusions from one section into indentations in an adjacent section.

As shown by the partially completed pad 100a FIG. 2, both the adjacent sections 112, 114 include a plurality of protrusions 120 and a plurality of indentations 119. As adjacent sections 112, 114 are folded toward one another as shown by arrow 116 along fold line 118, the adjacent sections are designed such that protrusions 120 fit into indentations 119 allowing the surfaces of the adjacent sections 112, 114 to fold directly against one another (although only a limited number of protrusions and indentations are shown for clarity's sake). In this manner, the protrusions provide support and comfort to the user without increasing the bulk or thickness of the sleeping pad once packed together as shown in FIG. 3.

The closed cell foam pad 100 is made from a closed cell foam material as is well known in the art and similar to that of the prior art however, the foam pad includes protrusions and indentations which provide significant additional user comfort yet packs in an alternating "accordion style" folding pattern as shown in FIG. 3 making the sleeping pad 100 much more packable. The closed cell foam pad 100 according to the present invention is configured such that when the pad is folded, adjacent sections containing protrusions and indentations nest perfectly together as explained herein. The indentations in the pad are arranged in an optimal pattern for efficient packing in the plane of the pad. The usable thickness of the closed cell foam pad 100 according to the present invention including the disclosed protrusions is nominally 1.2 to 2 times that of other closed cell foam pads having protrusions for user support and comfort, but instead the present pad packs to a smaller volume (thickness) such as in a pad without support protrusions at all.

Perfect nesting between sleeping pad sections is accomplished by ensuring that the top and bottom of the pad have the same (albeit mirrored) surface profile (i.e. protrusions and indentations) such that when the pad is folded, placing the top/bottom surface of one section against a top/bottom surface of another section insures that the sections nest together with no gap between the two surfaces. Minimizing or as in the present invention eliminating the gap between adjacent folded pad surfaces when the pad is folded has the advantage of reducing the packed volume of the pad. Minimizing the packed volume of the pad is important for closed cell foam pads because they tend to pack larger than other pads (such as air inflated pads for example. Minimizing the packed volume reduces a perceived negative characteristic of a closed cell foam pad while maintaining the comfort and other benefits of a closed cell foam pad.

Figure 4:
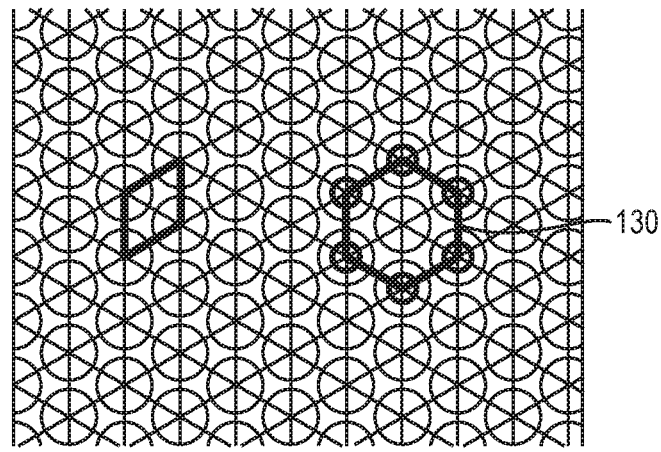
FIG. 4 illustrates the packing patterns of protrusions and indentations in accordance with the teachings of the present invention.
Figure 5:
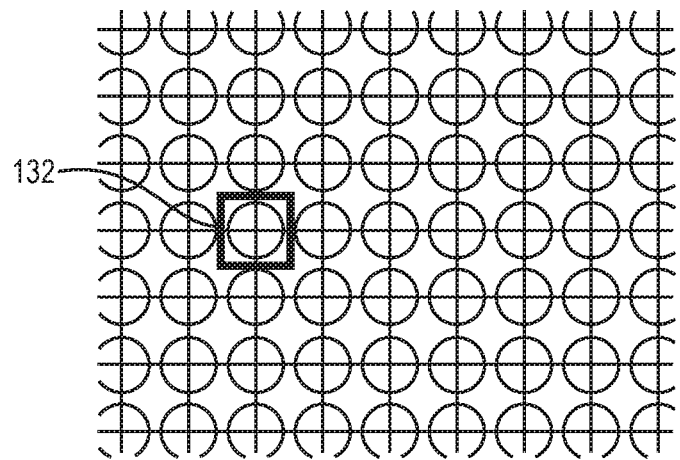
FIG. 5 illustrate the packing pattern of protrusions and indentations in conventional prior art.

The optimal pattern for the protrusions and indentations for packing on a plane is a hexagonal pattern 130 FIG. 4, where a circle is placed at the center and vertices of a normal hexagon shape or design. The six-sided hexagon 130 is formed by six (6) equilateral triangles. The center of the hexagon and the six vertices correspond to either a protrusion or indentation in the pad. This type of packing produces a packing density (circles per unit area) that is 1.15 times larger than a square packing pattern 132 shown in FIG. 5 which means that for the same bump/protrusion size, the hexagonal pattern will have 1.15 more points of contact on a person's body sleeping on the pad or the bump size could be increased by 1.15 times without sacrificing contact points.)

When the layers of the pad nest perfectly, the total packed thickness (tr) of the pad is determined by the foam thickness (tF) times the number of layers (nL), or tr=tF×nL. While the usable thickness (tu) of the pad is simply the thickness of the foam plus the thickness of the surface perturbations, or tu=tF+tp. Assuming the thickness of the foam pad and the surface perturbation are on the same order, increasing the thickness of the surface perturbation will have a relatively much larger effect on the usable thickness (and user comfort) than the packed thickness. On the other hand, increasing the foam thickness with have about the same relative effect on packed thickness and foam thickness. Therefore, increasing the perturbation thickness is a more desirable means to increase usable thickness rather than increasing the foam thickness. Usable thickness affects how the user "feels" when sleeping on the pad (i.e. how comfortable the pad feels). The greater the thickness the more comfortable the "feel" to the user. The construction of the sleeping pad 100 is hereinafter described with reference to FIG. 6.

The sleeping pad 100 comprises a pad body 134 having a top region 104, a bottom region 106, a length "l" and a width "w". The pad body 134 further includes a plurality of fold lines 118 disposed across generally the entire width "w" of the pad body 134 and formed in the top region 104 (and bottom 106) regions of the pad body 134. The pad body 134 further typically comprises a second plurality of fold lines disposed across generally the entire width "w" of the pad body and formed in the bottom region 106 of the pad body

134 (as shown in FIG. 1). In one embodiment, the plurality of top region fold lines are arranged at predetermined intervals along the length "1" of the pad body 134 beginning a first distance from a first end of the length of the body portion. The plurality of bottom region fold lines are arranged at predetermined intervals along the length of the pad body portion beginning a second distance from the first end of the length of the body portion. In the preferred embodiment, the first distance is different from the second distance.

Figure 6:
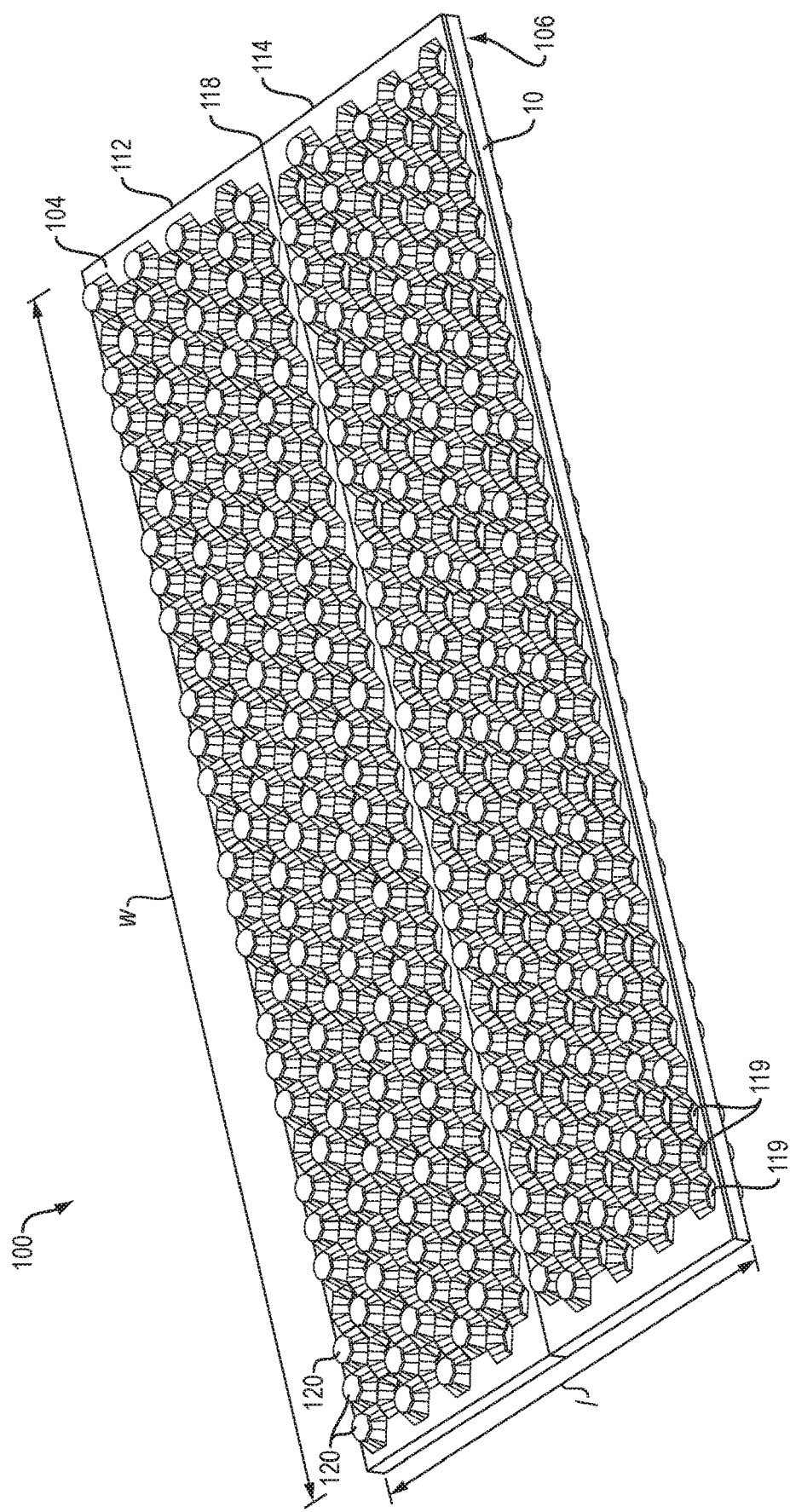
FIG. 6 illustrates two sleeping sections and the interaction and placement of the protrusions and indentations in adjacent sections.

The plurality of top and bottom region fold lines form a plurality of foldable sleeping pad connected sections 112, 115 for example, as seen in FIG. 6. The plurality of fold lines in the top and bottom regions of the pad body 134 are configured to allow the foldable sleeping pad 100 to fold "accordion style" (as shown in FIG. 1) such that one or more portions of the top/bottom regions from one foldable sleeping pad connected section are adjacent and in contact with one or more top/bottom regions of another foldable sleeping pad connected section of the pad body 118 when in a folded position.

In the preferred embodiment, each of the top and bottom regions includes a plurality of protrusions 120 and a plurality of indentations 119, wherein when the sleeping pad 100 is disposed in the accordion like folded configuration (see FIG. 3), the plurality of protrusions 120 from one of the top and/or bottom regions of one section of the pad body 134 nest into a corresponding plurality of indentations 119 from another one of the top and/or bottom regions of an adjacent and connected section of the pad body 134.

In another embodiment, the pad body 134 is a two layer closed cell foam, and the pad body 134 includes a heat reflective layer either on the top or bottom surface of the pad 134 or as a central layer.

In yet another embodiment, the pad body 118 has a first thickness and wherein the plurality of fold lines in the top and bottom portions of the pad body have a second thickness which is less than the first thickness and forming a hingeable connection 114 therebetween, as seen in FIG. 3.

Accordingly, the present invention provides a unique closed cell foam sleeping pad that has a foldable configuration and can be folded accordion style. The sleeping pad's top and bottom surfaces have a plurality of protrusions and a plurality of indentations, wherein the protrusions and indentations are arranged at different locations on different but adjacent foldable sections of the sleeping pad body such that when the pad is folded accordion style, the protrusions nest into the indentations perfectly to give the sleeping pad a smaller packing density while at the same time providing the protrusions for added user comfort.

Modifications and substitutions by one of ordinary skill in the art are considered to be within the scope of the present invention, which is not to be limited except by the allowed claims and their legal equivalents.

The invention claimed is:

1. A foldable sleeping pad, comprising:
   a pad body having a top region and a bottom region, a length and a width, wherein each of said top and bottom regions includes a plurality of protrusions and a plurality of indentations, wherein said plurality of protrusions and said plurality of indentations are arranged in a hexagonal pattern wherein one of said plurality of protrusions or one of said plurality of indentation are placed at the center and vertices of a normal hexagon;
   wherein said pad body further includes a first plurality of fold lines disposed across generally said entire width of said pad body and formed in said top region of said pad body, and wherein said pad body includes a second plurality of fold lines disposed across generally said entire width of said pad body and formed in said bottom region of said pad body;
   wherein said plurality of top region fold lines are arranged at predetermined intervals along said length of said pad body beginning a first distance from a first end of said length of said body portion and wherein said plurality of bottom region fold lines are arranged at predetermined intervals along said length of said pad body portion beginning a second distance from said first end of said length of said body portion, said first distance being different from said second distance, said plurality of top and bottom region fold lines forming a plurality of foldable sleeping pad connected sections; and
   wherein said plurality of fold lines in said top and bottom regions of said pad body are configured to allow said foldable sleeping pad to fold accordion style such that one or more portions of said top region from one foldable sleeping pad connected section are adjacent and in contact with one or more portions of said bottom region from another one foldable sleeping pad connected section of said pad body when in a folded position.

2. The sleeping pad according to claim 1, wherein when said sleeping pad is disposed in said accordion like folded configuration, said plurality of protrusions from one of said top and bottom regions of one section of said pad body nest into a corresponding plurality of indentations from another one of said top and bottom regions of an adjacent and connected section of said pad body.

3. The sleeping pad according to claim 1, wherein said pad body is made of closed cell foam.

4. The sleeping pad according to claim 3, wherein said pad body is a two layer closed cell foam.

5. The sleeping pad according to claim 4, wherein said two layer closed cell foam pad body includes a heat reflective layer.

6. The sleeping pad according to claim 5, wherein said pad body has a first thickness and wherein said plurality of fold lines in said top and bottom portions of said pad body have a second thickness which is less than said first thickness, wherein said fold line is configured for forming a hingeable connection between.

7. A foldable sleeping pad, comprising:
   a pad body having a top region and a bottom region, a length and a width;
   wherein said pad body further includes a first plurality of fold lines disposed across generally said entire width of said pad body and formed in said top region of said pad body, and wherein said pad body includes a second plurality of fold lines disposed across generally said entire width of said pad body and formed in said bottom region of said pad body, wherein said plurality of top region fold lines are arranged at predetermined intervals along said length of said pad body beginning a first distance from a first end of said length of said body portion and wherein said plurality of bottom region fold lines are arranged at predetermined intervals along said length of said pad body portion beginning a second distance from said first end of said length of said body portion, said first distance being different from said second distance, said plurality of top and bottom region fold lines forming a plurality of foldable sleeping pad connected sections, and wherein said plurality of fold lines in said top and bottom regions of said pad body are configured to allow said foldable sleeping pad to fold accordion style such that one or more portions of said top region from one foldable sleeping pad connected section are adjacent and in contact with one or more portions of said bottom region from another one foldable sleeping pad connected section of said pad body when in a folded position;

wherein each of said top and bottom regions includes a plurality of protrusions and a plurality of indentations, wherein when said sleeping pad is disposed in said accordion like folded configuration, said plurality of protrusions from one of said top and bottom regions of one section of said pad body nest into a corresponding plurality of indentations from another one of said top and bottom regions of an adjacent and connected section of said pad body;

wherein said plurality of protrusions and said plurality of indentations are arranged in a hexagonal pattern wherein one of said plurality of protrusions or one of said plurality of indentation are placed at the center and vertices of a normal hexagon;

wherein said pad body is a two layer closed cell foam; and wherein said pad body includes a heat reflective layer.

8. The sleeping pad according to claim 7, wherein said pad body has a first thickness and wherein said plurality of fold lines in said top and bottom portions of said pad body have a second thickness which is less than said first thickness and forming a hingeable connection between.

9. A foldable sleeping pad, comprising:

a pad body having a top region and a bottom region, a length and a width;

wherein said pad body further includes a first plurality of fold lines disposed across generally said entire width of said pad body and formed in said top region of said pad body, and wherein said pad body includes a second plurality of fold lines disposed across generally said entire width of said pad body and formed in said bottom region of said pad body, wherein said plurality of top region fold lines are arranged at predetermined intervals along said length of said pad body beginning a first distance from a first end of said length of said body portion and wherein said plurality of bottom region fold lines are arranged at predetermined intervals along said length of said pad body portion beginning a second distance from said first end of said length of said body portion, said first distance being different from said second distance, said plurality of top and bottom region fold lines forming a plurality of foldable sleeping pad connected sections, and wherein said plurality of fold lines in said top and bottom regions of said pad body are configured to allow said foldable sleeping pad to fold accordion style such that one or more portions of said top region from one foldable sleeping pad connected section are adjacent and in contact with one or more portions of said bottom region from another one foldable sleeping pad connected section of said pad body when in a folded position;

wherein each of said top and bottom regions includes a plurality of protrusions and a plurality of indentations, wherein said plurality of protrusions and said plurality of indentations are arranged in a hexagonal pattern wherein one of said plurality of protrusions or one of said plurality of indentation are placed at the center and vertices of a normal hexagon;

wherein when said sleeping pad is disposed in said accordion like folded configuration, said plurality of protrusions from one of said top and bottom regions of one section of said pad body nest into a corresponding plurality of indentations from another one of said top and bottom regions of an adjacent and connected section of said pad body; and wherein said pad body is made of closed cell foam.

10. The sleeping pad according to claim 9, wherein said pad body is a two layer closed cell foam.

11. The sleeping pad according to claim 10, wherein said pad body includes a heat reflective layer.

12. The sleeping pad according to claim 11, wherein said pad body has a first thickness and wherein said plurality of fold lines in said top and bottom portions of said pad body have a second thickness which is less than said first thickness and forming a hingeable connection between.

* * * * *